Feb. 3, 1925.  
V. C. BOX  
AUTOMATIC TRAP NEST  
Filed Oct. 18, 1923  
1,525,266  
5 Sheets-Sheet 1

Inventor  
V. C. Box.

Feb. 3, 1925.
V. C. BOX
AUTOMATIC TRAP NEST
Filed Oct. 18, 1923
1,525,266
5 Sheets-Sheet 2
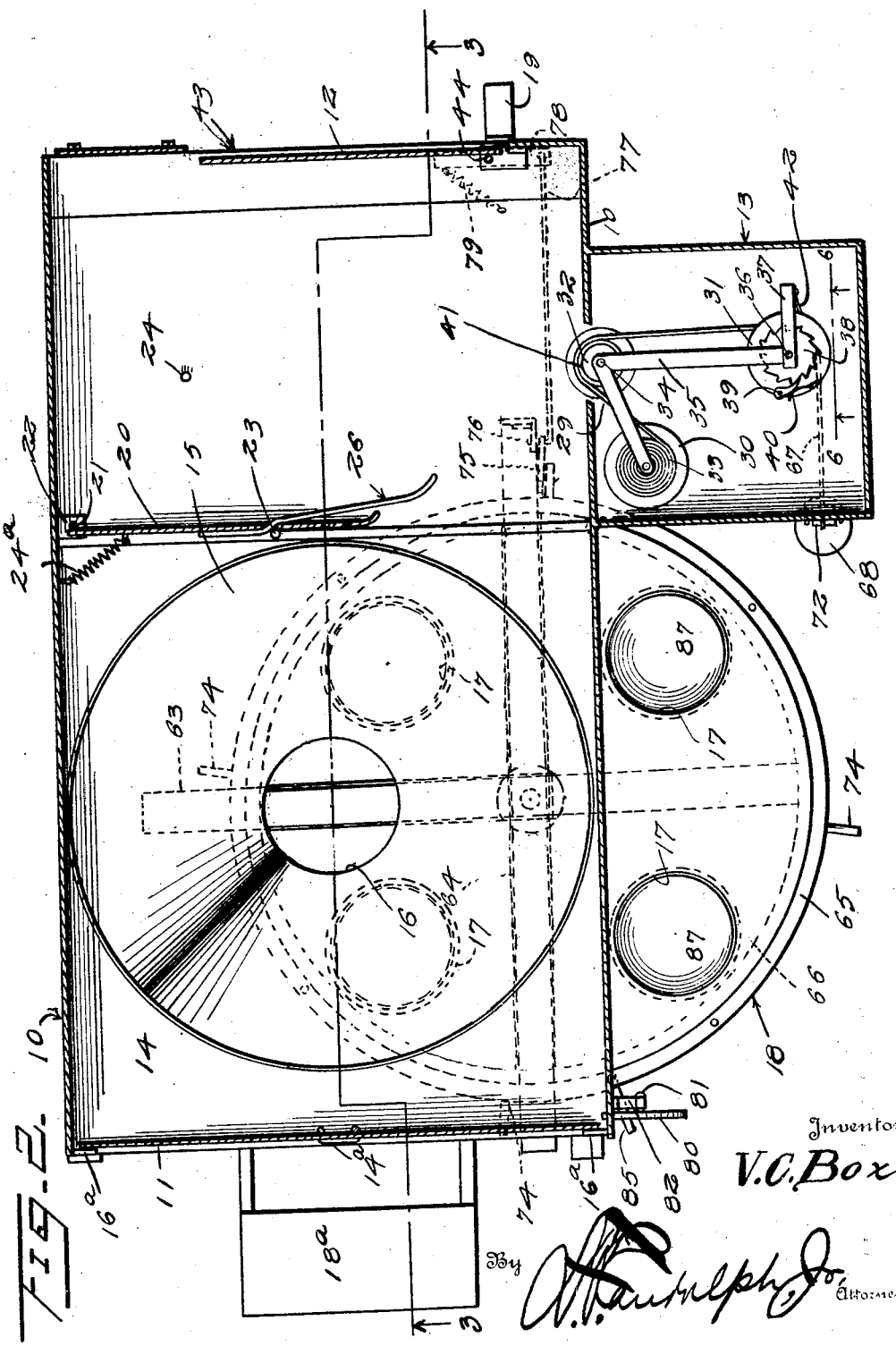

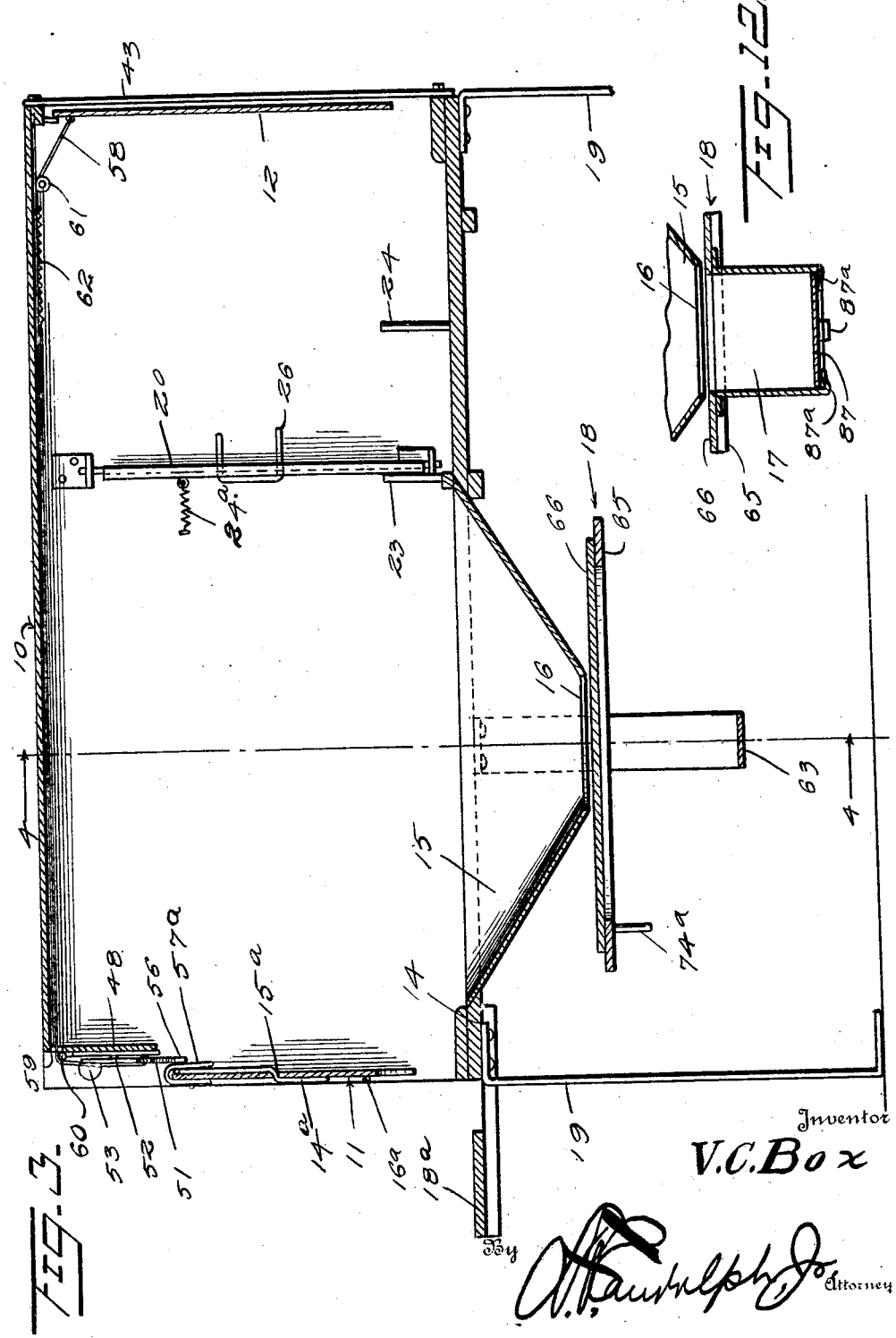

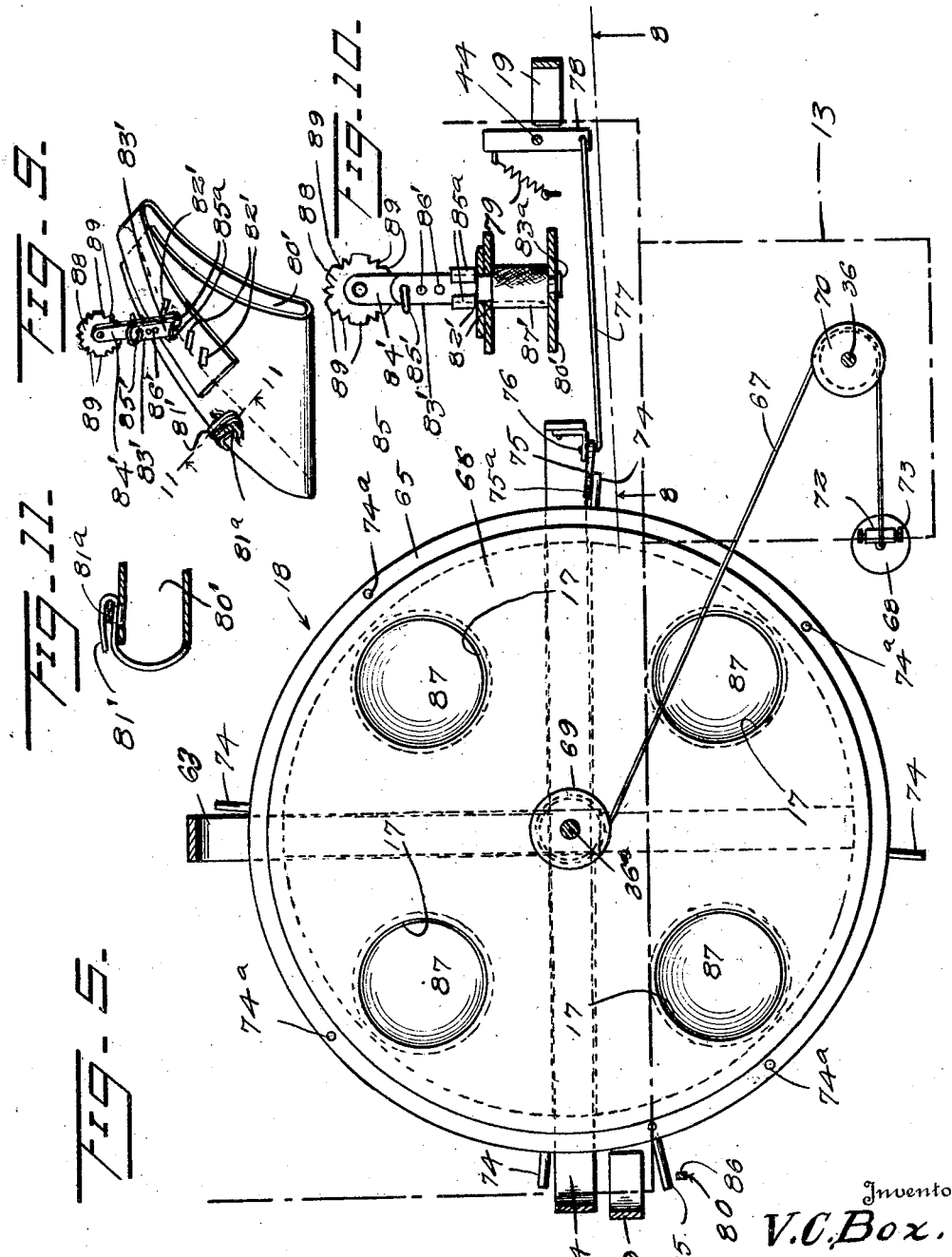

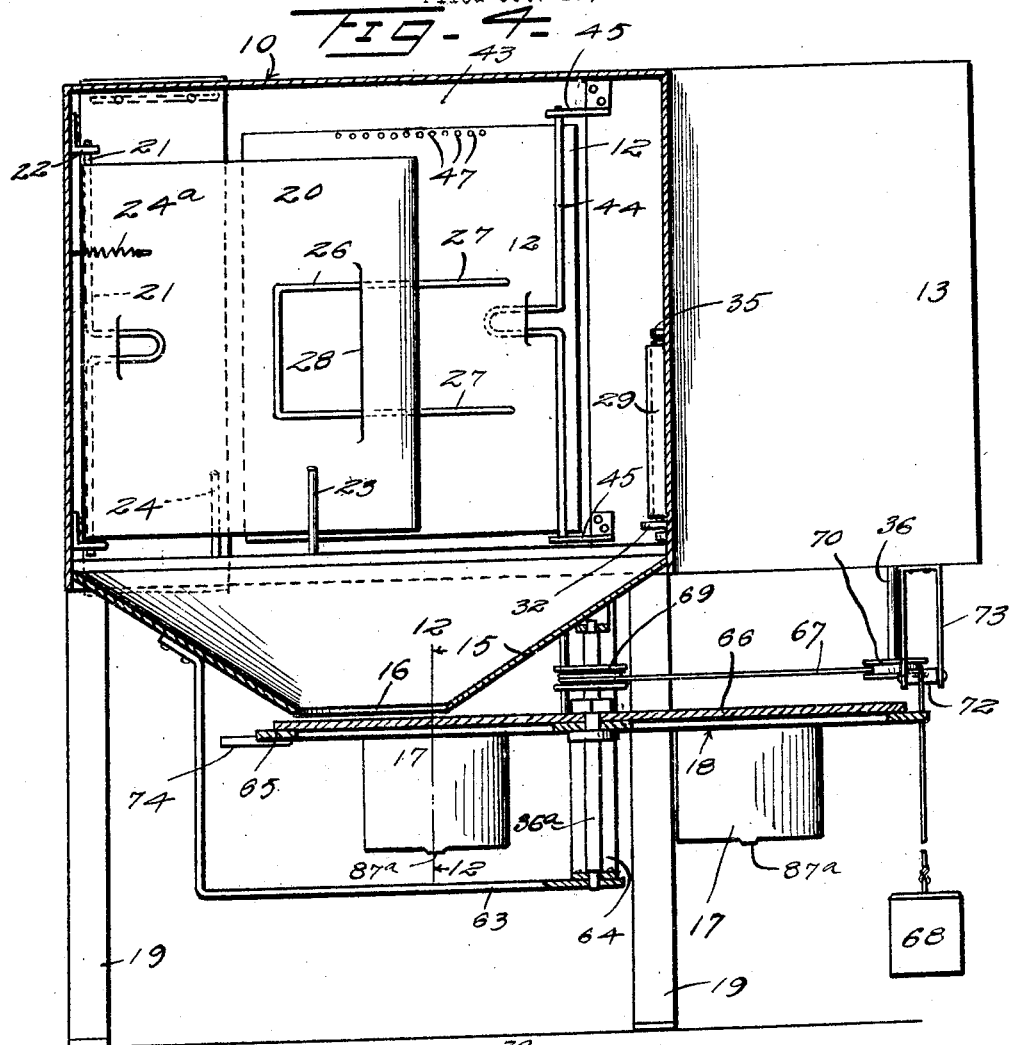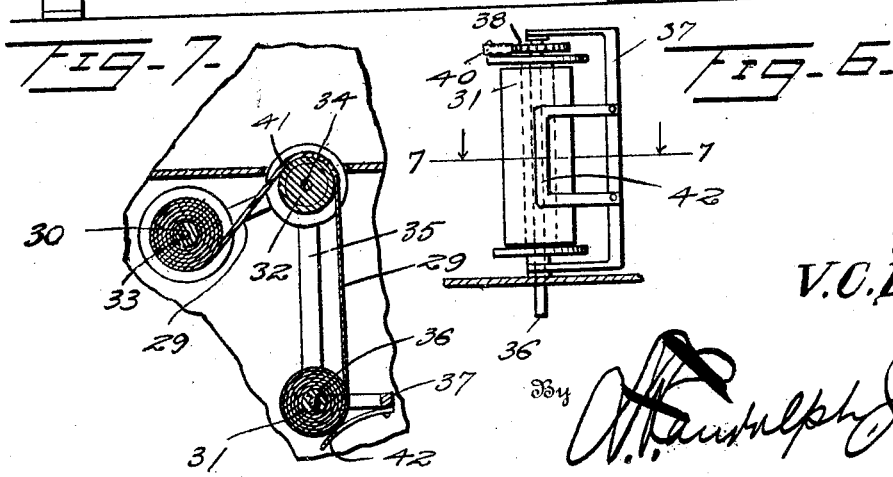

Patented Feb. 3, 1925.

1,525,266

UNITED STATES PATENT OFFICE.

VIRGIL C. BOX, OF BLUE RIDGE, TEXAS.

AUTOMATIC TRAP NEST.

Application filed October 18, 1923. Serial No. 669,426.

*To all whom it may concern:*

Be it known that I, VIRGIL C. Box, a citizen of the United States, residing at Blue Ridge, in the county of Collin and State of Texas, have invented certain new and useful Improvements in Automatic Trap Nests; and I do hereby declare the following to be a full, clear, and exact description of the invention, such as will enable others skilled in the art to which it appertains to make and use the same.

This invention relates to an automatic trap nest particularly although not necessarily adapted for use by chickens.

It is aimed to provide a novel means whereby it may be determined which hens are laying and how often, so that the owner may determine the hatchability of the eggs of any certain hen and the vigor and productiveness of the offspring and thus enable the poultryman to care for and feed economically and to breed for any desired characteristics in a more effective manner.

Another object is to provide a novel means to trap a hen in the nest in order to prevent entrance by other hens while the nest is occupied and in order to compel exit of the hen, after laying, through the proper way.

A third object is to provide a novel record means to determine which hens are laying and a means to insure movement of the hen from the nest in such a manner as to positively produce a record that will positively identify the egg laid by any certain hen, and further to provide a novel marker adapted to be carried by or attached to a wing of the hen.

A further object is to provide a removable receptacle having elements to successively receive the eggs and with the receptacle operable through the exit of the hens from the nest and other elements to positively close the egg escape in the bottom of the nest while the hen is on the nest.

A still further object is to provide a novel means to lock the nest against the entrance of hens after the receptacle is filled with eggs.

Various additional objects and advantages will become apparent from a consideration of the description following taken in connection with accompanying drawings illustrating an operative embodiment.

In said drawings:—

Figure 3 is a sectional view taken on the line 3—3 of Figure 2;

Figure 4 is a cross sectional view taken on the line 4—4 of Figure 3;

Figure 5 is a sectional view taken on the line 5—5 of Figure 1;

Figure 6 is a sectional view taken on the line 6—6 of Figure 2;

Figure 7 is a sectional view through the recording means taken on the plane of line 7—7 of Figure 6;

Figure 8 is a sectional view taken on the line 8—8 of Figure 5;

Figure 9 is a detail perspective view of the marker which is attached to the hen wing;

Figure 10 is a vertical sectional view through the marker proper and showing its bars connecting the ends of the wing clasp together;

Figure 11 is a detail section taken on line 11—11 of Figure 9, and

Figure 12 is a detail sectional view taken on the line 12—12 of Figure 4.

Like reference characters designate like or similar parts in the different views.

Figure 2:
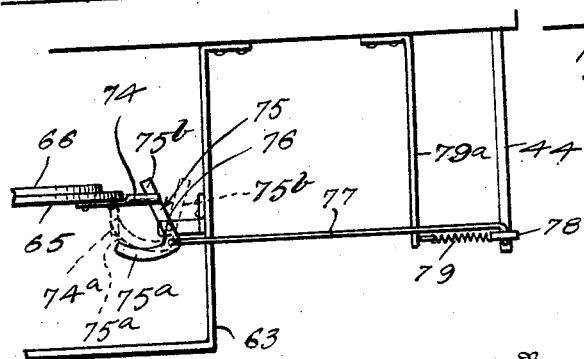
Figure 2 is a sectional view taken on the line 2—2 of Figure 1.

In carrying out the invention, a box or housing 10 is provided which as best seen in Figure 2, is generally of L-shape. The entrance door to the housing is designated 11 and the exit door is designated 12. The housing has a lateral extension at 13.

The lower wall of the housing as designated 14 has a nest 15 secured thereto as by soldering and which depends from said wall 14. The nest 15 is of any suitable shape but preferably frusto-conical, and cut off and open at the frustrum as at 16 so that eggs laid in the nest 15 may travel into pockets 17 of an egg carrier generally designated 18. The housing 10 is preferably supported by suitable legs 19 to the end that the parts below the same will be elevated that all may be readily cleansed and ventilated in order to maintain the trap in a sanitary condition.

The entrance door 11 has a hinge rod 12ª adjacent its top pivotally mounted in brackets 13ª fastened to the housing. Rod 12ª has a U-shaped portion 14ª intermediate its ends suitably secured to the door 11 and passing through a slit 15ª of said door in order to engage both inner and outer sides of the door and thus brace it. This door 11 is normally adapted to hang in a vertical position and its outward movement is limited by stop pins 16ª extending into the doorway and carried by the housing. The distal edge portion of the door 11 as at 17ª is notched to facilitate entrance of a hen and to guide the hen in entering the nest, and a step 18ª is fastened to the housing adjacent said doorway, preferably of a size to accommodate a single hen at a time. The hen in entering the nest will alight on the step 18ª and then pass into the nest 15 under the doorway at notch 17ª, moving the door by the pressure of her body against it. As the hen leaves the nest, her body will contact with a guide door 20 which is pivoted by means of a rod 21 in brackets 22 of the casing, so that such door may swing on a vertical axis intermediate stops 23 and 24 carried by the housing. Rod 21 is similar in shape to the rod 12ª and secured to the door 20 in the same manner as rod 12ª is secured to the door 11. The door 20 is normally maintained in engagement with stop 23 by reason of a contractile spring 24ª which is fastened to the housing. The hen is adapted to pass the door 20 at its distal end and through a way, which is exposed, and into which an extension 26 of the door 20 projects. The extension 26 may consist of a U-shaped frame, as best shown in Figure 4, having its tines 27 slidably passing through and frictionally and adjustably held in a slit 28 of the door 20. By reason of this construction of the door, the hen in leaving the nest is adapted to brush against the door 20 and its tines 27 which will guide her into contact with a recording tape 29.

Tape 29 is adapted to be rolled off of a roller 30 and on to a roller 31 and to pass over a roller 32. Rollers 30 and 32 by means of shafts 33 and 34 are removably journaled in brackets 35 generally of U-shape and suitably fastened to and within the housing 10. Roller 31 is rotatable on a shaft 36 rigidly and removably fastened to the brackets 35 and to a second bracket 37. On the said shaft 36 a ratchet wheel 38 is fastened and a pawl 39 pivoted on the roller 31 coacts with the ratchet wheel 38 and is urged into engagement therewith by a spring 40 on the roller 31. Pawl 39 is moved out of engagement with the ratchet 38 after winding of shaft 36 and before operation can take place. The recording tape 29 may be of paper or other suitable material and the surface of the roller 32 over which it passes is coated with carbon or other transfer material as at 41 so that as the hen engages the tape at the portion thereof in engagement with carbon 41, by means carried on the hen as will be later described, the record will be made against the inner surface of the tape. Frame 37 carries a pressure spring 42 which engages the tape wrapped about the roller 31 so that the tape may be held smoothly and firmly against roller 32.

Figure 1:
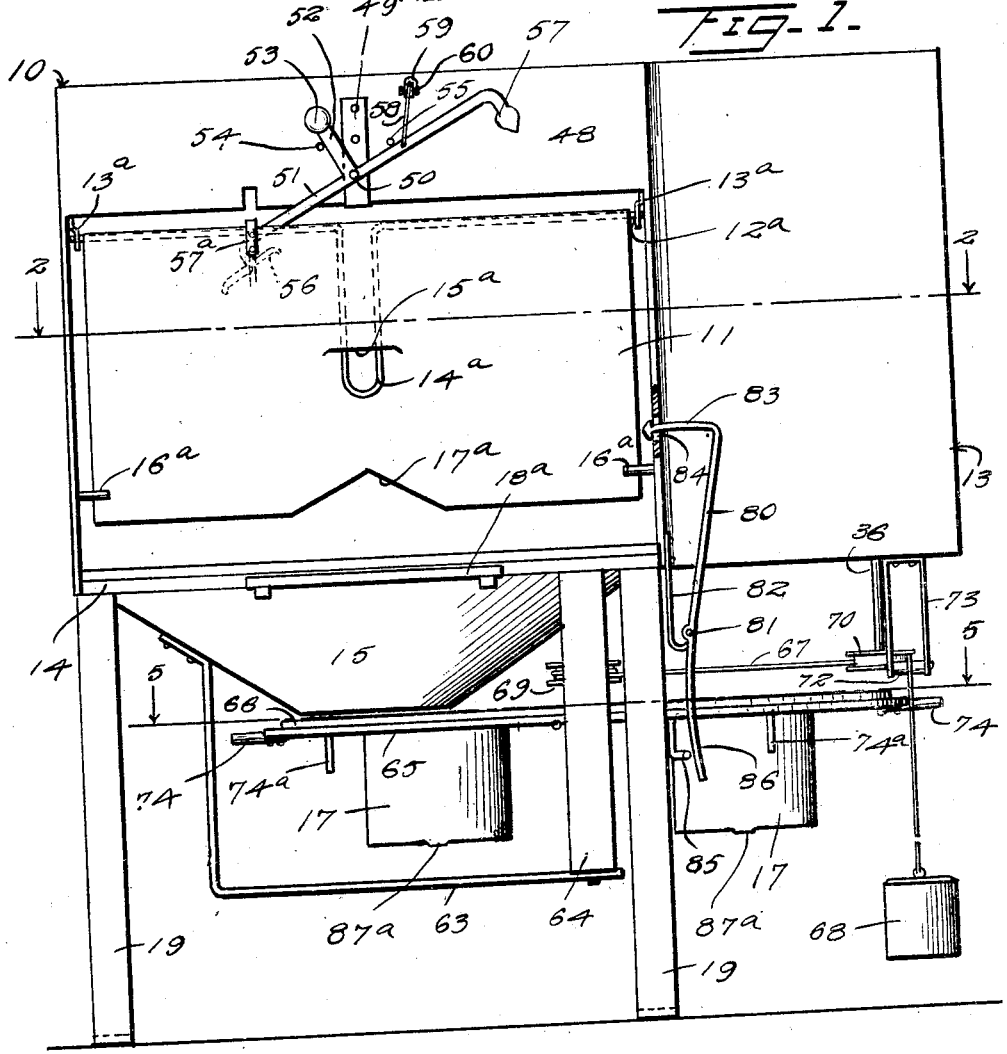
Figure 1 is a view in front elevation illustrating the improved nest.

The hen leaves the trap through a doorway 43 closed normally by the door 12 and the door 12 is held closed so that a hen cannot enter through the end of the trap. Door 12 is adapted to swing on a vertical axis and is hinged by means of a rod 44 similar to the rods 12ª and 21 are fastened to the door 12 in the same manner as the rods 12ª and 21 are fastened to the doors 11 and 20, respectively. Rod 44 is journaled in brackets 45 carried by the housing 10. The escaping hen will swing the door 12 outwardly on its pivot 44 and such door will close through the action of a contractile spring 79 hereinafter more specifically referred to. At the front of the housing 10 a wall 48 is provided above the door 11 and pivoted to a cleat 49 thereon as at 50 is a latch lever 51 having a central arm 52 weighted as at 53 and which arm is movable in a path intermediate stop pins 54 and 55 provided on wall 48. One end of lever 51 is provided with an arm 56 and the other end with a blade 57. Normally the arm 56 as shown in Figure 1, is in engagement with a U-shaped trip 57ª fastened against the inner surface of the door 11 so that when the hen swings the door 11 inwardly, the trip 57ª by its engagement with arm 56 will tilt the lever 51 moving the arm 52 to the other side of the vertical to that shown in Figure 1 and in contact with the stop 55, accordingly moving the blade 57 on the opposite side of the door 11 to the stops 16ª, so that after a hen has entered, the position of blade 57 will prevent opening of the door 11, and thus entrance of another hen, until the lever 51 has been returned to its normal position of Figure 1. The return of the lever 51 to the normal position of Figure 1 is brought about through the opening movement of the rear door 12 by the hen and a draw cable 58 fastened to the lever 51 and to the door 12, passing loosely through an opening 59 in the wall 48 and over direction rollers 60 and 61 provided respectively on the wall 48 and within the housing 10 adjacent door 12. A spring 62 may form part of the cable 58 and enable the cable to lengthen should the hen be of undue size when passing through the doorway 43 and thus requiring the opening of the door 12 to more than the usual degree and further adjustment may be provided by means of perforations 47 in the top of door 12 to positively release latch lever 51 thus making the adjustment adaptable to hens of different sizes.

A shaft 36$^a$ is positioned below the housing and is there journaled in a frame consisting of sections 63 and 64 fastened together and to the housing. This shaft supports a rigid ring 65 and a disk 66 which, together with the cups 17, constitute the egg carrier 18. The egg carrier 18 is rigidly secured to the shaft 36$^a$ and is adapted to be rotated by a cable 67 under influence of a weight 68. The cable 67 is fastened to and wrapped a number of times about a pulley 69 fastened on shaft 36$^a$ and about a pulley 70 fixed to the lower end of the shaft 36 of the roller 31 and about a direction pulley 72 journaled on a bracket 73 depending from the extension 13.

The rotation or turning of the egg carrier 18 is controlled by stops 74 and 74$^a$ extending from the ring 65 and cooperating with a latch 75 having ends 75$^a$ and 75$^b$. The weight 68 is held against descent so as not to rotate the egg carrier 18 when the latch 75 is engaged by one of the stop pins 74. Latch 75 is pivoted as at 76 to the frame section 63 and is adapted to be actuated by a rod or cable 77 connected to said latch and to a crank 78 rigid with the rod 44 below the housing 10. A return spring 79 may be fastened to a bracket 79$^a$ and to the end of crank 78 opposite to that to which the rod 77 is fastened. The pins 74 and 74$^a$ are spaced equidistantly apart and the same distance apart as the pockets 17. Stop pins 74$^a$ are spaced midway between stop pins 74, and successive actuations of door 12 will withdraw the latch 75 out of engagement with the adjacent pin 74 and place the latch 75$^a$ into the path of movement of adjacent pin 74$^a$. Pin 74$^a$ by coming into engagement with latch 75$^a$ arrests further movement of carrier 18 until the hen has passed out of rear door 12. In this arrested position a pocket 17 comes into registry with opening 16 in the bottom of nest 15 thus allowing the egg that may have been laid in nest 15 to gravitate into pocket 17 while the hen is passing through rear door 12. By thus arresting the movement of 18 the egg may gravitate to 17 without any danger of being crushed. When the hen has passed the rear door 12 spring 79 returns door 12 to its normal closed position and returns latch 75 to its normal position and releasing 75$^a$ from engagement with 74$^a$ thus allowing receptacle 18 to continue its movement until latch 75 engages the next pin 74 and moves 17 out of register with 16 and brings 66 to position that closes 16.

Means is provided to lock the door 11 against opening when all of the pockets 17 have been filled. To this end a lock lever 80 is provided, being pivoted at 81 to a bracket 82 depending from housing 10. This lever 80 has a locking arm 83 slidably disposed through an opening 84 in housing 10 whereby it may assume a position on the opposite side of the door 11 to the stops 16$^a$. A trip lug 85 depends from the disk 66 and at the proper time is adapted to engage the distal end portion 86 of lever 80 so as to rock said lever and thereby project locking arm 83 against the interior of the door 11 and thus prevent opening of the nest until the same has been reset.

The pockets 17 have cushioned bottoms 87 held in place by straps 87$^a$ which are continuations of pockets 17, said straps being bent into the horizontal thereby making a spring supported bottom that will prevent the eggs breaking as they fall into pockets 17. The pawl and ratchet connection at 38 and 40 is provided so that winding of the tape 29 will not be effected incidental to resetting of the trap.

In the operation of the trap, with lever 51 normally in the position shown in Figure 1, a hen alights on the perch or step 18$^a$ and then enters the housing 10 and nest 15 through the way covered by door 11, swinging such door 11 inwardly. This inward movement of the door shifts the lever 51, by engagement of the trip 57$^a$ with arm 56, into position where the blade 57 is disposed against the inner surface of the door 11, thus preventing entrance of another hen into the trap while it is occupied. After laying the egg, the hen leaves the nest, thus engaging the door 20 and its extension 26, guiding the hen so that means carried by one of her wings will make recording contact with the portion of tape 29 in engagement with the carbon surface or coating at 41. After passing the tape 29, the hen brushes against and forces the door 12 open and effects her escape. As the door 12 opens, this draws the cable 58, thus tilting the lever 51 back to the position shown in Figure 1 so that the door 11 may be opened and the trap entered by another hen. Also as the door 12 opens, it swings the crank 78 which through the medium of the rod 77, moves the latch 75 out of engagement with the adjacent stop 74. Thereupon the weight 68 is free to draw the cable 67 downwardly, thus rotating the shaft 36 and carrier 18 so that the portion of the tape 29 bearing the record will be wound upon the roller 31 and an unused portion of the tape presented for the record of the succeeding hen. After the lever 75 disengages the adjacent stop 74 latch 75 is placed in the path of the adjacent pin 74a. The engagement of latch 75 with stop pin 74a arrests the movement of disk 66 until the hen has passed out the rear door 12 and stops pocket 17 in register with opening 16 so that an egg may gravitate from nest 15 through escape 16 into pocket 17. When the hen has cleared the rear door 12, spring 79 returns latch 75 to its normal position, closes door 12 and releases latch 75 and allowing carrier 18 to move until 75 engages the next stop pin 74 and pocket 17 is moved out of register with egg escape 16 and 16 is closed in laying condition for the next hen. When through successive operations of the machine, all of the receptacles or pockets 17, are filled, stop lug 85 engages lever 80 and tilts the same thereby projecting the arm 83 in front of the door 11 and locking the door 11 and the machine until the eggs have been removed from the pockets 17 and the trap reset.

The marking means carried by a wing of the hen to coact with the tape 29 may be of the form shown in Figures 9, 10 and 11. Such means consists of a suitable clasp body 80' of bendable metal or other material adapted to be bent about the right wing of the hen. It is better held in place by the provision of an adjustable strap 81', integral with it, in connection with a fastening loop 81a. The clasp has through its overlapping end portions, suitable openings 82' adapted to register and to receive a fastening means to permit attachment of the clasp to chickens whose wings vary in size. Through any selected two of the openings 82' as shown in Figure 10, a bar 83' is passed having an upset head 83a to fasten it to one side of the clasp. This bar above the clasp detachably receives a bar 84' secured thereto by a bolt or bendable wire 85' passing through suitable openings of series 86', and by lugs 85a, which bar overlaps bar 83'. On the bar 83' a rubber buffer or sleeve 87' may be provided so as to engage the wing of the hen and prevent chafing or irritation thereof. A marker wheel 88 is journaled on the bar 84' and has projections 89 whose distal surfaces are adapted to make the record by engagement with tape 29, at the portion thereof in contact with the carbon 41 carried by roller 32 so that the record will appear in carbon on the surface of the tape opposite to that engaged by the pins 89. Pins 89 may have their distal surfaces of any suitable configuration, at the present time being adapted to make dots and dashes. The sizes of the dots and dashes of the different markers will vary so that each hen will have a separate marker or means of identification to make her record on the tape, to the end that it may be determined which hens are laying and how often, by observing and comparing the different records on the tape of the trap or the tape on a number of traps used in common by the hens.

The marking wheel 88 may be dispensed with or if used, be capable of removal after unfastening element 85' to permit bar 84' to be removed. The marking will then be effected merely by the distal end of bar 84'.

Various changes in the details may be resorted to provided they fall within the spirit and scope of the invention.

What is claimed is:—

1. A nest having an entrance door, a latch member, means to shift said latch member through opening of the door whereby a part of the latch member will engage the door and prevent opening thereof while the nest is occupied, and means to restore the latch to normal position operable by a hen upon leaving the nest.

2. A nest having an entrance door adapted to swing on a horizontal axis, a latch lever pivoted intermediate its ends and on a substantially horizontal axis at a right angle to the first mentioned axis and having an arm adjacent one end and a blade adjacent the other end, means on the door engageable with said arm through opening thereof to tilt the lever and arrange the blade in latching relation therewith.

3. A nest having an entrance door, a latch lever pivoted intermediate its ends and having an arm adjacent one end and a blade adjacent the other end, means on the door engageable with said arm through opening thereof to tilt the lever and arrange the blade in latching relation therewith, and means to maintain the lever in either normal or latching positions, and means operable to restore the lever to normal position through escape of a hen from the nest.

4. A nest having record means rising from the floor of the nest operable by the hen as she leaves the nest and disposed at one side of her path of travel, and means to direct the hen laterally into engagement with said means.

5. A nest having record means operable by a hen as she leaves the nest and disposed at one side of her path of travel, means to direct the hen laterally into engagement with said means, consisting of a horizontally swinging door, means to limit movement of the door, and means to urge movement of the door to normal position.

6. A nest having record means operable by a hen as she leaves the nest and disposed at one side of the path of travel, means to direct the hen laterally into engagement with said means, consisting of a horizontally swinging door, means to limit movement of the door and means to urge movement of the door to normal position, and an extension means for said door to accommodate operation by hens of different sizes.

7. A trap nest having a housing, a horizontally swinging door within the housing, the nest having a way adjacent the distal side edge of the door, recording means engageable by a hen in line with said way, and said door being engageable by the hen and adapted to direct her laterally into engagement with the recording means.

8. A trap nest having a housing, a horizontally swinging door within the housing, the nest having a way adjacent the distal side edge of the door, recording means engageable by a hen in line with said way, said door being engageable by the hen and adapted to direct her laterally into engagement with the recording means, and means operable by the hen as she leaves the nest to advance said recording means for engagement by the succeeding hen.

9. A nest having a recording tape engageable by a hen, rollers over which said tape passes, a driven shaft on which one of said rollers is journaled, a ratchet on said shaft, and a pawl on the latter roller coacting with said ratchet, and a pressure means to engage the tape about the latter roller.

10. A nest having a receiver provided with pockets, means to urge rotation of the receiver, stop means on the receiver, a latch member engageable by the stop means, means under control of a hen leaving the nest to release the latch means to permit advancement of the receiver, a trip door for the nest, a latch and means on the receiver engageable with said latch to secure said door against opening after a cycle of movement of the receiver, and means on the receiver engageable with said last mentioned latch.

11. A nest having a rotatable receiver, a ring on which said receiver rests, a frame of which said ring forms part, a shaft rigid with the receiver and journaled on said frame, means to urge rotation of the shaft, means under control of a hen leaving the nest to impart a step by step movement to the receiver, and a record means engageable by a hen and adapted to be advanced through movement of said shaft.

12. A nest having an opening for the escape of eggs from the nest, an egg receiver normally closing said opening and also provided with egg-receiving means, and means operable by the hen as she leaves the nest to move the egg-receiving means into registry with said opening.

13. A nest having an opening for the escape of eggs from the nest, a means to receive said eggs, and means on the first mentioned means normally preventing escape of the eggs into the egg-receiving means operable by the hen as she leaves the nest to permit the escape of the eggs.

14. A nest having an egg discharge opening, egg receiving means normally preventing discharge of the egg from the opening, means to move the egg receiving means to egg releasing position as the hen moves toward the exit of the nest, and means to prevent movement of the egg receiving means from egg receiving position prior to the hen leaving the nest.

15. A nest having a housing, a nest member therein, an outlet door for the housing, a frame secured to the housing and including a ring, a rotatable disk disposed on said ring, egg receiving pockets carried by said disk and adapted for step by step registration with the nest member, removable closures for the pockets, a shaft journaled by said frame and rigid with said disk, a pulley wheel on said shaft, a cable passing over said pulley wheel, a weight to urge movement of the cable and rotation of the shaft, guide pulleys for the cable, stop members on the disk, a latch in the path of movement of the stop members, and means under control of the movement of said outlet door to move the latch into releasing relation with said stop members, and record means for engagement with a hen adapted for advancing movement through the rotation of said shaft.

16. A marking device consisting of a body attachable to a hen, a bar having a section extending through end portions of the body, a buffer surrounding said section within the body, a bar section attachable to said first mentioned section, and a marker carried by the bar section.

In testimony whereof I affix my signature in presence of two witnesses.

VIRGIL C. BOX.

Witnesses:
 CLARENCE BOX,
 R. H. FULLER.